(12) United States Patent
Williams

(10) Patent No.: US 7,753,236 B2
(45) Date of Patent: Jul. 13, 2010

(54) LIQUID STORAGE

(75) Inventor: Graham Frederick Williams, Solihull (GB)

(73) Assignee: The Coca-Cola Company, Atlanta, GA (US)

( * ) Notice: Subject to any disclaimer, the term of this patent is extended or adjusted under 35 U.S.C. 154(b) by 1002 days.

(21) Appl. No.: 10/343,889

(22) PCT Filed: Sep. 24, 2001

(86) PCT No.: PCT/GB01/04238

§ 371 (c)(1),
(2), (4) Date: Jul. 17, 2003

(87) PCT Pub. No.: WO02/24578

PCT Pub. Date: Mar. 28, 2002

(65) Prior Publication Data

US 2004/0031752 A1     Feb. 19, 2004

(30) Foreign Application Priority Data

Sep. 23, 2000   (GB)   .................................. 0023394.0

(51) Int. Cl.
*B67D 7/76* (2010.01)
*B65D 88/54* (2006.01)

(52) U.S. Cl. ........................ 222/190; 222/318; 222/424; 210/515; 210/618; 210/268

(58) Field of Classification Search ................ 222/190, 222/318, 424; 210/615, 616, 617, 618, 619, 210/764, 765, 266, 515, 268
See application file for complete search history.

(56) References Cited

U.S. PATENT DOCUMENTS

| | | | | |
|---|---|---|---|---|
| 3,327,859 A | * | 6/1967 | Pall | ............................ 210/266 |
| 3,756,410 A | * | 9/1973 | Moody et al. | ............... 210/139 |
| 4,086,066 A | | 4/1978 | McDermott | .................... 44/51 |
| 4,601,831 A | * | 7/1986 | Cook | .......................... 210/764 |
| 4,784,763 A | * | 11/1988 | Hambleton et al. | ........... 210/90 |
| 4,826,594 A | * | 5/1989 | Sedman | ...................... 210/266 |
| 4,902,432 A | * | 2/1990 | Kuno | .......................... 210/764 |
| 5,115,956 A | * | 5/1992 | Kirschner et al. | ........ 222/129.1 |

(Continued)

FOREIGN PATENT DOCUMENTS

JP        6142667        5/1994

(Continued)

*Primary Examiner*—Kevin P Shaver
*Assistant Examiner*—Melvin A Cartagena
(74) *Attorney, Agent, or Firm*—Sutherland Asbill & Brennan LLP

(57) ABSTRACT

Apparatus for storing water, especially purified water, for use in a beverage dispenser is provided with a microbiological agent to kill or deter microbiological growth and maintain the quality of the water. The agent is provided in a physical form to promote contact with the water and may be renewable to maintain effectiveness of the agent over a period of time. In one arrangement, the agent is contained in a cartridge 92 arranged in a re-circulation loop 89 through which the water in a reservoir 80 is passed and returned to the reservoir 80. The cartridge 92 and/or a carrier for the agent within the cartridge 92 may be replaceable to renew the agent. The agent may also be provided within the reservoir 80 and various arrangements for this are also disclosed.

2 Claims, 6 Drawing Sheets

U.S. PATENT DOCUMENTS

| | | | |
|---|---|---|---|
| 5,749,500 A * | 5/1998 | Kraus et al. | 222/377 |
| 5,776,333 A * | 7/1998 | Plester et al. | 222/129.1 |
| 5,788,858 A * | 8/1998 | Acernese et al. | 210/257.2 |
| 5,817,325 A * | 10/1998 | Sawan et al. | 424/411 |
| 5,868,933 A * | 2/1999 | Patrick et al. | 210/484 |
| 5,961,843 A * | 10/1999 | Hayakawa et al. | 210/764 |
| 5,976,385 A | 11/1999 | King | 210/754 |
| 6,126,931 A | 10/2000 | Sawan et al. | 424/78.09 |
| 6,395,168 B1 * | 5/2002 | Acernese et al. | 210/198.1 |

FOREIGN PATENT DOCUMENTS

| | | |
|---|---|---|
| JP | 7178393 | 7/1995 |
| JP | 11314096 | 11/1999 |
| WO | WO 94/26622 | 11/1994 |

* cited by examiner

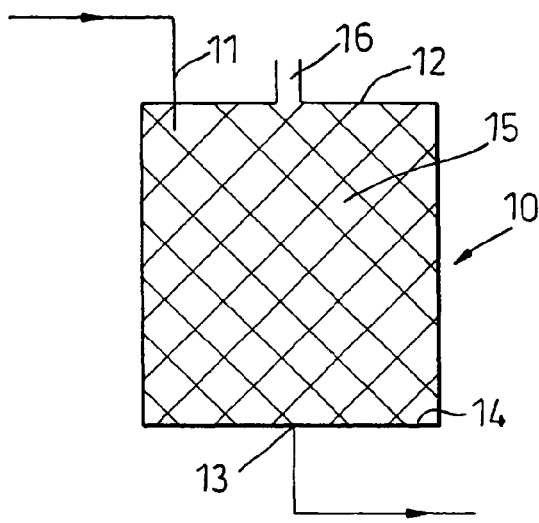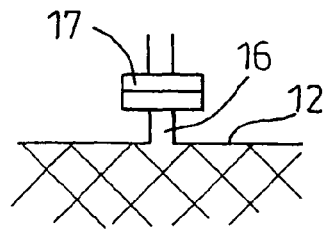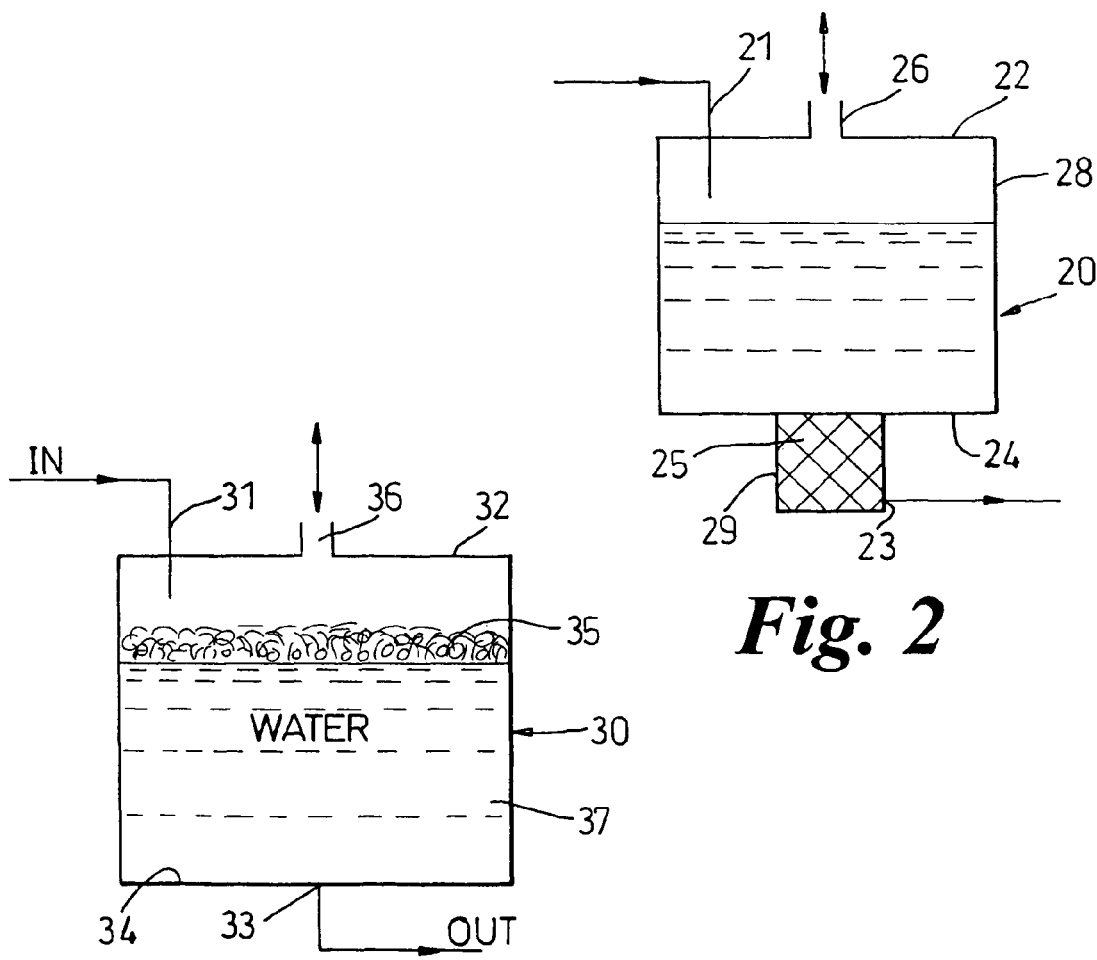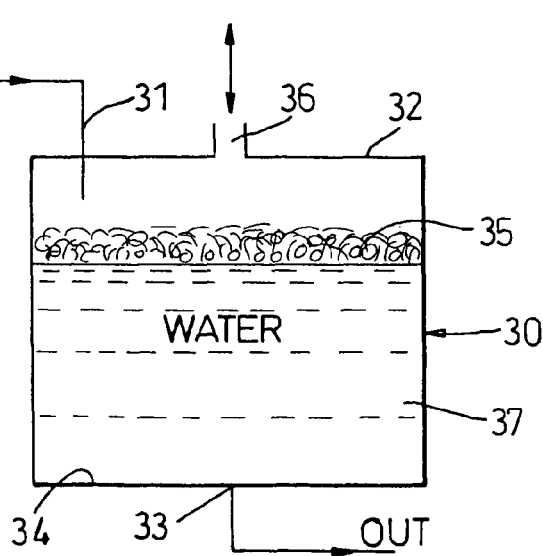

LIQUID STORAGE

This invention relates to the storage of liquids, particularly but not exclusively water. For convenience it will be described below with specific reference to water.

There have been numerous proposals for the treatment of water to purify it and many of these proposals have been devised bearing in mind that water quality and purity vary considerably from location to location and that a relatively simple treatment means is required that can be used in a wide variety of situations and that is, preferably, renewable.

Many of the known treatments involve filtration and heat stages and are successful to greater and lesser degrees in providing a convenient, economical means of providing water of acceptable purity in respect not only of content of chlorine, heavy metals, organics, carbonates and the like but also in respect of microbiological quality.

Regardless of the actual treatment method used, many treatment processes are devised to provide a reservoir of treated water which can be drawn off for use as and when required, i.e. the treated water is not used immediately but must be stored for varying periods of time. One specific example is in the treatment of water for post-mix beverage dispensers in which a beverage is mixed from a concentrate and a diluent, usually water, at the point of sale. The water to be used may have been subjected to a purification treatment and it may then be stored in a suitable reservoir before being drawn off in a required amount for each beverage dispense.

Although such stored water may be of high purity and of high microbiological quality on entering the reservoir or other storage system, neither it nor the reservoir will normally be sterile. There is, therefore, always a risk that the microbiological state of the stored water will deteriorate with time. Simple addition of microbiocidal material to the reservoir has not proved to be a satisfactory solution as adequate contact is difficult to achieve.

It is, therefore, an object of the present invention to provide a liquid storage apparatus in which this problem may be ameliorated or eliminated.

Accordingly the invention provides a liquid storage apparatus, the apparatus comprising a reservoir for the liquid, the reservoir containing a microbiological agent to kill or deter microbiological growth, the microbiological agent being in a physical form to present a sufficient contact area with the liquid to provide the required effect.

In a first general embodiment the wall of the reservoir may be formed of material, usually plastics material, in which the microbiological agent is present or onto which it is coated. Thus the agent may conveniently have been compounded into the composition used to form the walls of the reservoir. The "walls" may, of course, include the floor and roof and the agent may similarly be incorporated in conduits and fittings of the reservoir. However, we have found that such an arrangement does not by itself provide the desired degree of contact time and area to effectively treat all the water or other liquid that may be contained in the reservoir.

Thus in this embodiment of the invention, we have found that it is preferable to provide agitation means within the reservoir to promote increased water/wall contact or recirculation means to pass the water out of and back into the reservoir. Both means may be used in combination. Where the water is recirculated, it may also be passed through, e.g. a cartridge, containing further microbiological agent, to further improve the treatment and contact time. The further microbiological agent may be in any convenient form, e.g. granular or in a reticulated foam. A labyrinth may be provided in the cartridge in the recirculation line to further improve flow path contact time with the agent.

In a second general embodiment, the microbiological agent is present in the tank in an open cell, e.g. reticulated, foam, in fibre, or in granular form to provide the required surface area to allow adequate contact. It may be coated onto the foam, fibres or granules but it may be found more convenient for it to be compounded into the compositions from which these bodies are formed.

The microbiological agent may be any suitable biocide or biostatic agent and examples include triclosan, zinc pyrithione, silver compounds and KDF. The latter is a metallic combination of copper and zinc, which is available in a variety of forms including granules, wool and reticulated foam.

The agent may be incorporated in a variety of readily available plastics materials which can be processed by conventional means including injection moulding, blow moulding, rotational moulding and extrusion for use in the first embodiment of the invention. Alternatively it may be incorporated in plastics compositions which are processed to a carrier form, e.g. reticulated foam, granule or fibrous form for insertion into the reservoir in the second embodiment.

In the second embodiment of the invention, the carrier form of the agent may be of volume to completely fill the reservoir, in which case a vent will be needed to allow filling of and drawing from the reservoir. For example, the reservoir may be completely filled with reticulated foam containing the agent and the water enters to fill the voids in the foam and thereby ensures a good and sufficient contact area for the agent to work. An air filter may be fitted into the vent.

Alternatively the reservoir may be a sealed tank, i.e. unvented, with sufficient headspace left during use to allow filling and emptying to take place or it may contain a collapsible membrane as a barrier to atmosphere.

Alternatively the carrier may form a layer in the reservoir through which the water must pass on its travel from the reservoir inlet to the outlet. The layer may be attached to the reservoir walls or take the form of a floating layer of, e.g., foam or granules. Again the reservoir may be vented, with a filter, if desired.

In another arrangement the carrier may form a layer on the floor of the reservoir or be in a "sump" in the base of the reservoir.

Where a foam is used as the carrier for the agent, it may be used in compressed or uncompressed state whereby the volume to surface area ratio may be enhanced by changing the cell size.

It will be appreciated that the carrier, e.g. the foam, can present an extremely large surface area to contact the water. Reticulated foam, for example, can absorb almost up to its own volume of liquid thereby ensuing maximum effective use of the microbiological agent.

Embodiments of the invention will now be described by way of example only with reference to the accompanying drawings in which:

FIG. 1 is a diagrammatic representation of a reservoir tank according to the invention;

FIG. 1A is an enlarged view of an alternative form of a portion of the apparatus of FIG. 1;

FIG. 2 is a similar view to FIG. 1 of a second reservoir tank of the invention;

FIG. 3 is a similar view of a third reservoir tank of the invention;

Figure 4:
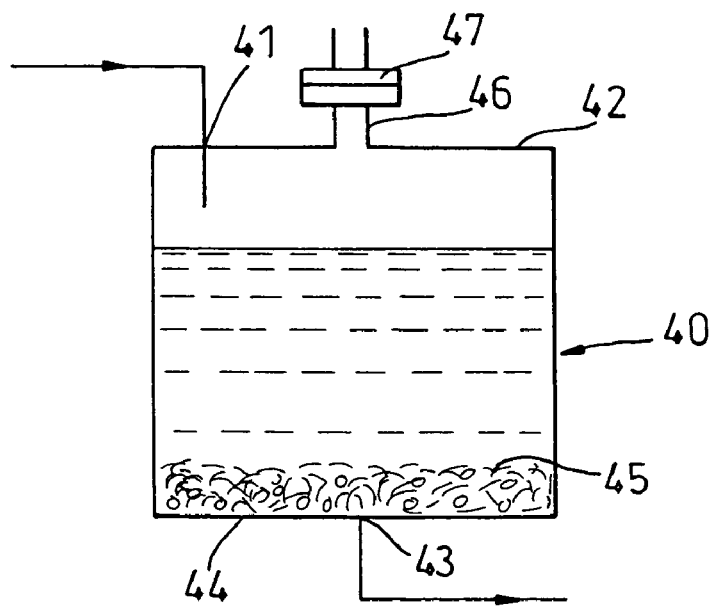
FIG. 4 is a similar view of a fourth reservoir tank of the invention.

In FIG. 1 a reservoir for water is a tank 10 having an inlet 11 in its roof 12 and an outlet 13 in its floor 14. The tank is filled with reticulated foam 15 which has been impregnated with a biocide and/or a biostatic agent. A vent 16 in roof 12 of the tank allows water to be filled into and drawn out of the tank. The reticulated foam, which may be polyurethane foam, may be replaced by granules which have been poured in to fill the tank.

As shown in FIG. 1A, vent 16 may contain an air filter 17 of, for example, 0.2 micron pore size.

In FIG. 2 a tank 20 has an upper housing 28 which leads into a smaller "sump" housing 29 extending below the floor 24 of housing 28. As above, the tank has an inlet 21 in its roof 22 and in this instance has an outlet 23 from the base of sump 22. The sump 29 is filled with reticulated foam or granules containing the microbiological agent.

A vent 26 is provided in roof 22. This may again contain a filter, if desired.

In FIG. 3 a tank 30 has an inlet 31 in its roof 32 and an outlet 33 in its floor 34. A vent 36, with or without a filter, is again provided in roof 32. A blanket 35 of foam, fibre or granules impregnated with the desired microbiological agent floats on the surface of water 37 in the tank.

In FIG. 4 a tank 40 again has an inlet 41 in its roof 42 and an outlet 43 in its floor 44. A vent 46 with a filter 47 is also provided in roof 42. In this embodiment a non-floating layer 45 of foam, granules or fibre, suitably impregnated with the desired agent lies on the floor 44 of the tank.

It will be appreciated that the embodiment of FIGS. 1 to 4 are all variants of the second general embodiment of the invention and that in each instance, the water, or other liquid, must pass through the microbiological agent carrying layer on its journey from the inlet to the outlet. Good contact is, therefore, ensured for all the water before it is drawn off for use.

Figure 5:
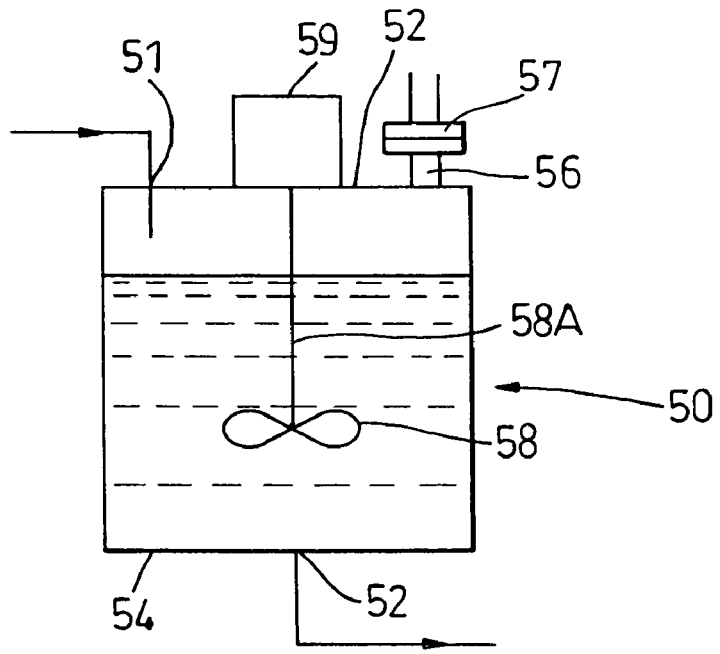
FIG. 5 is a similar view of a fifth reservoir tank of the invention.
Figure 6:
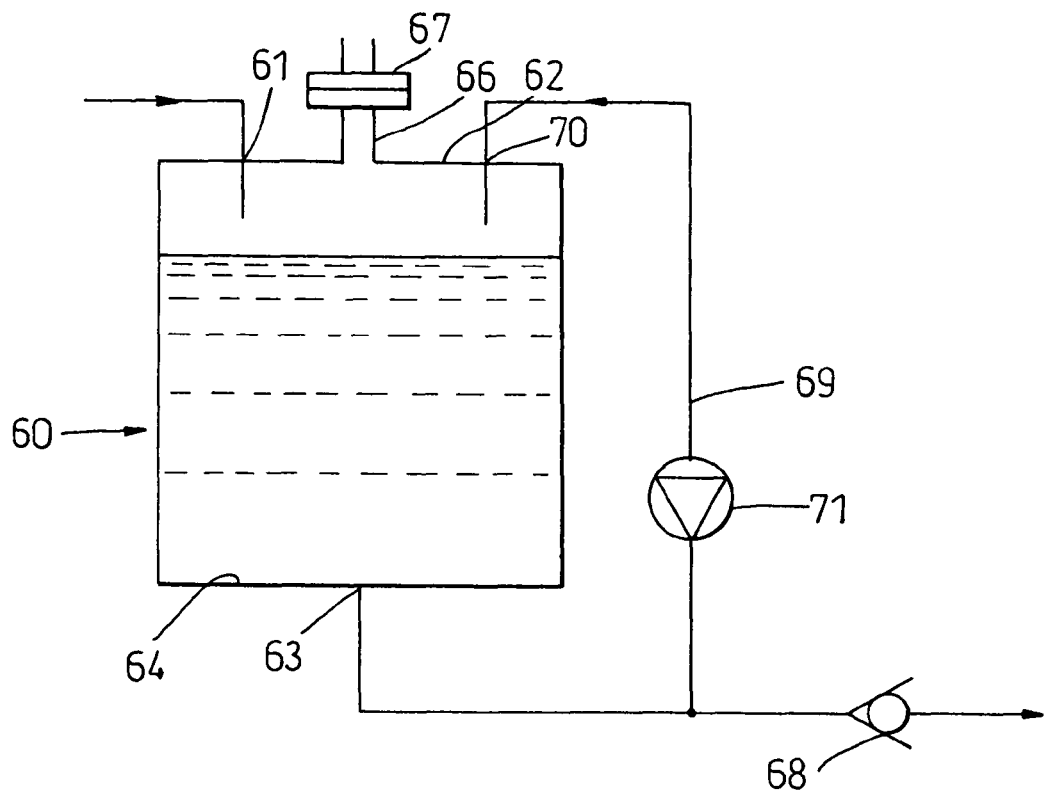
FIG. 6 is a similar view of a sixth reservoir tank of the invention.
Figure 7:
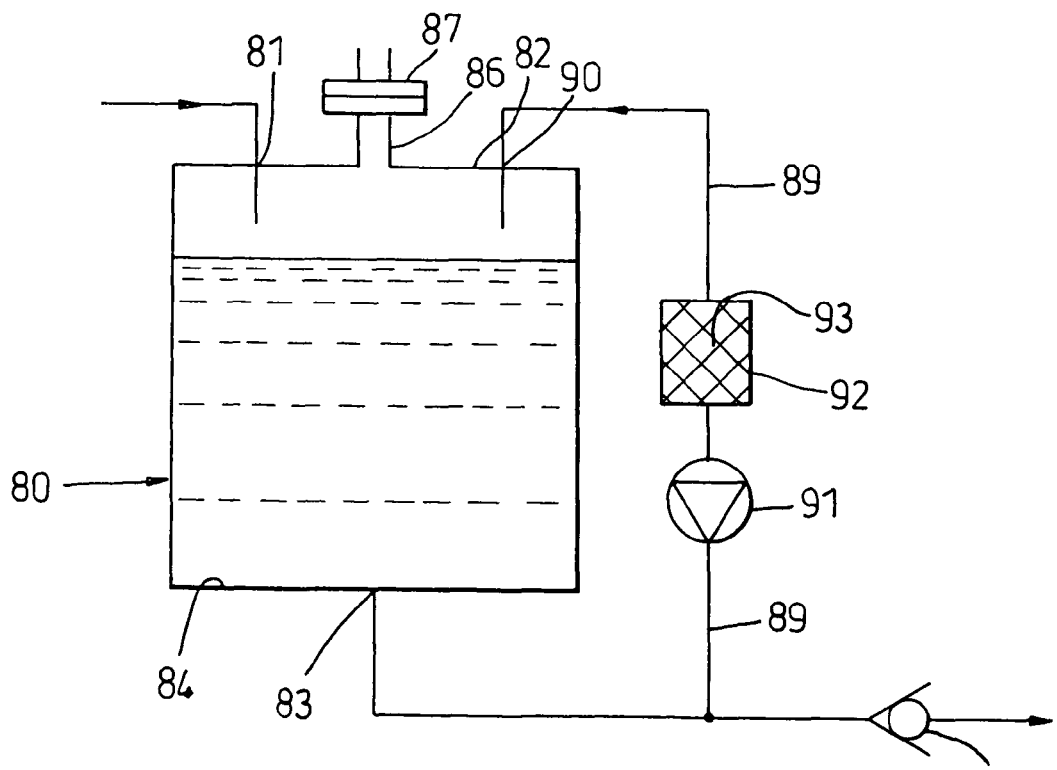
FIG. 7 is a similar view of a seventh reservoir tank of the invention.
Figure 8:
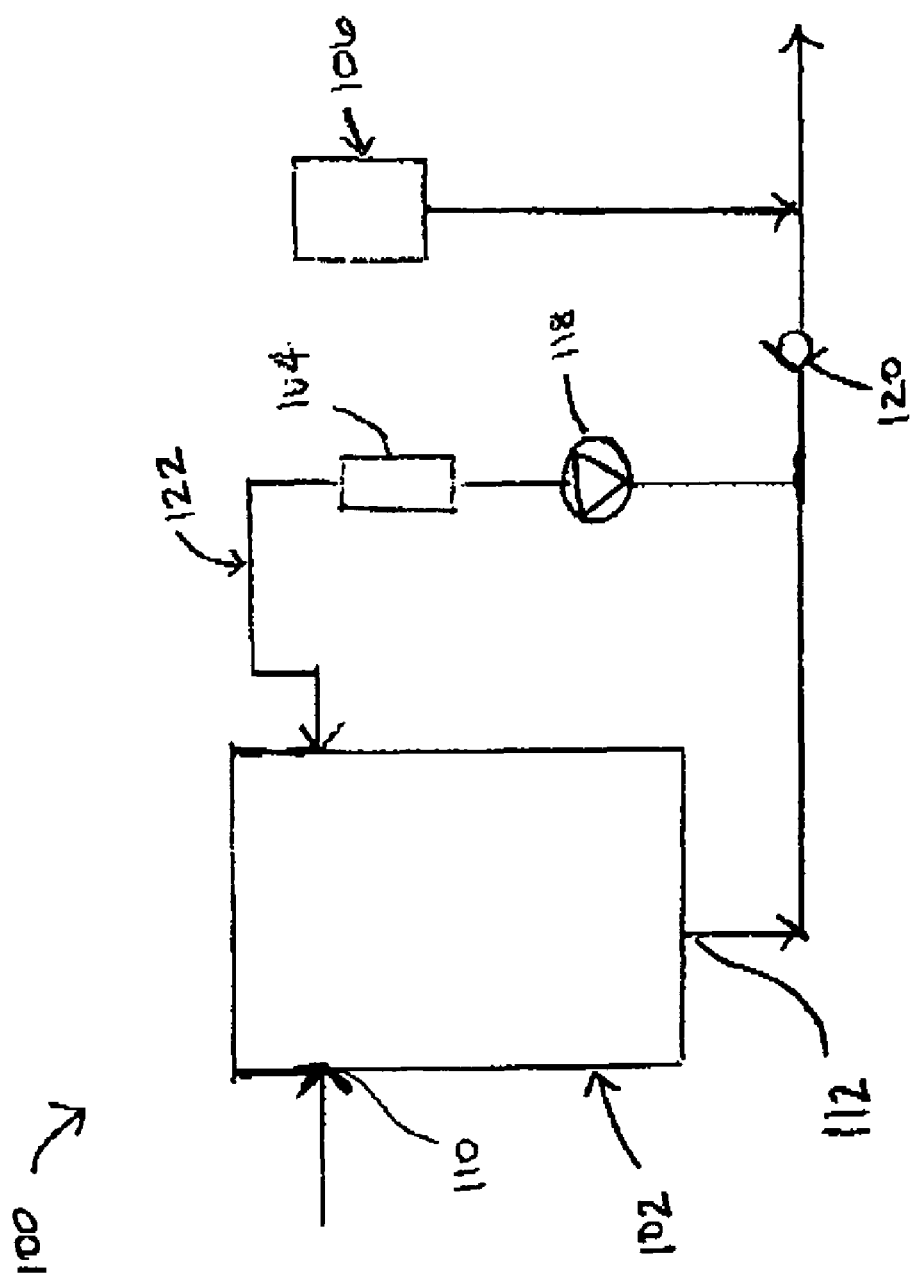
FIG. 8 is a process flow diagram view of one embodiment of a beverage dispenser apparatus as described herein.
Figure 9:
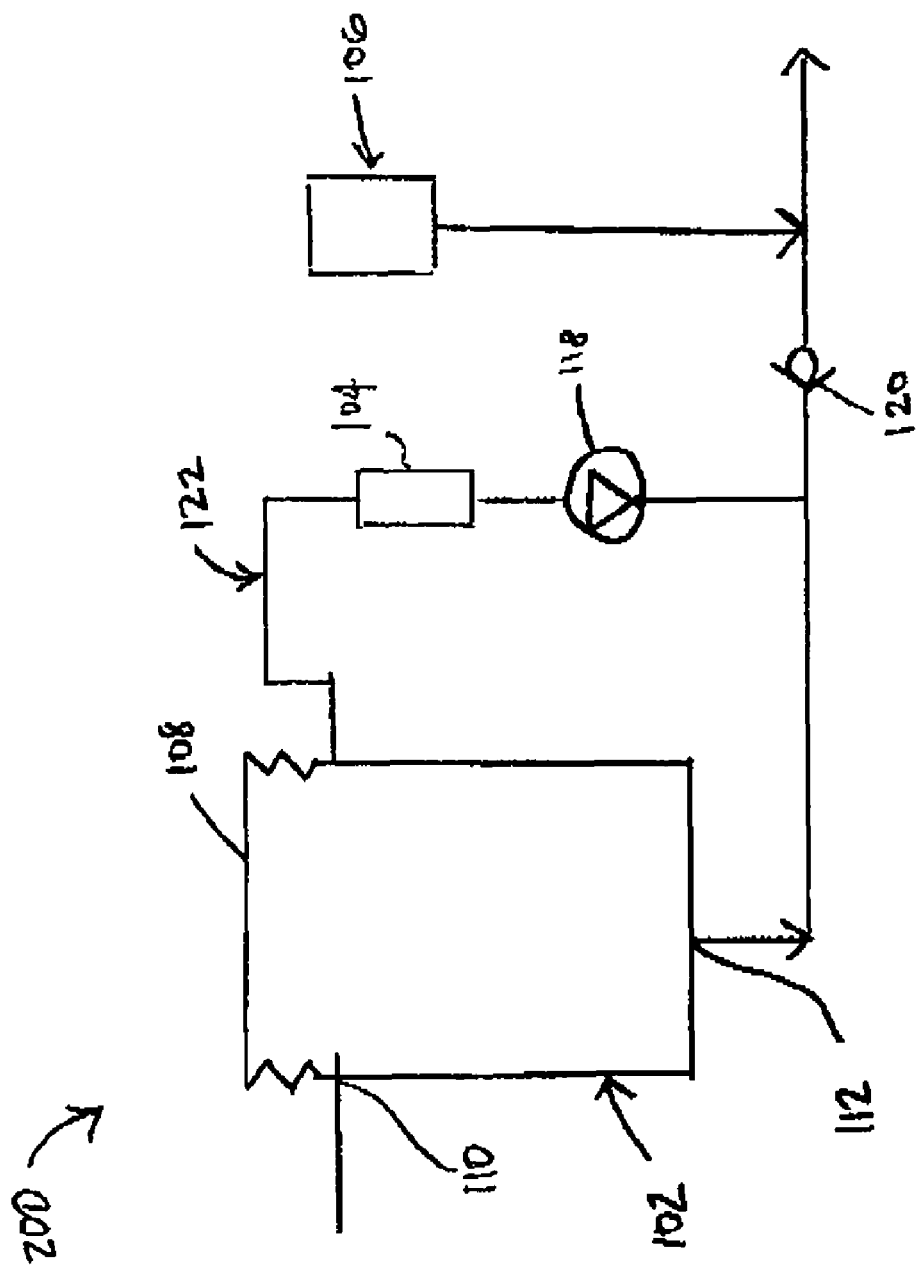
FIG. 9 is a process flow diagram of one embodiment of a beverage dispenser apparatus as described herein.
Figure 10:
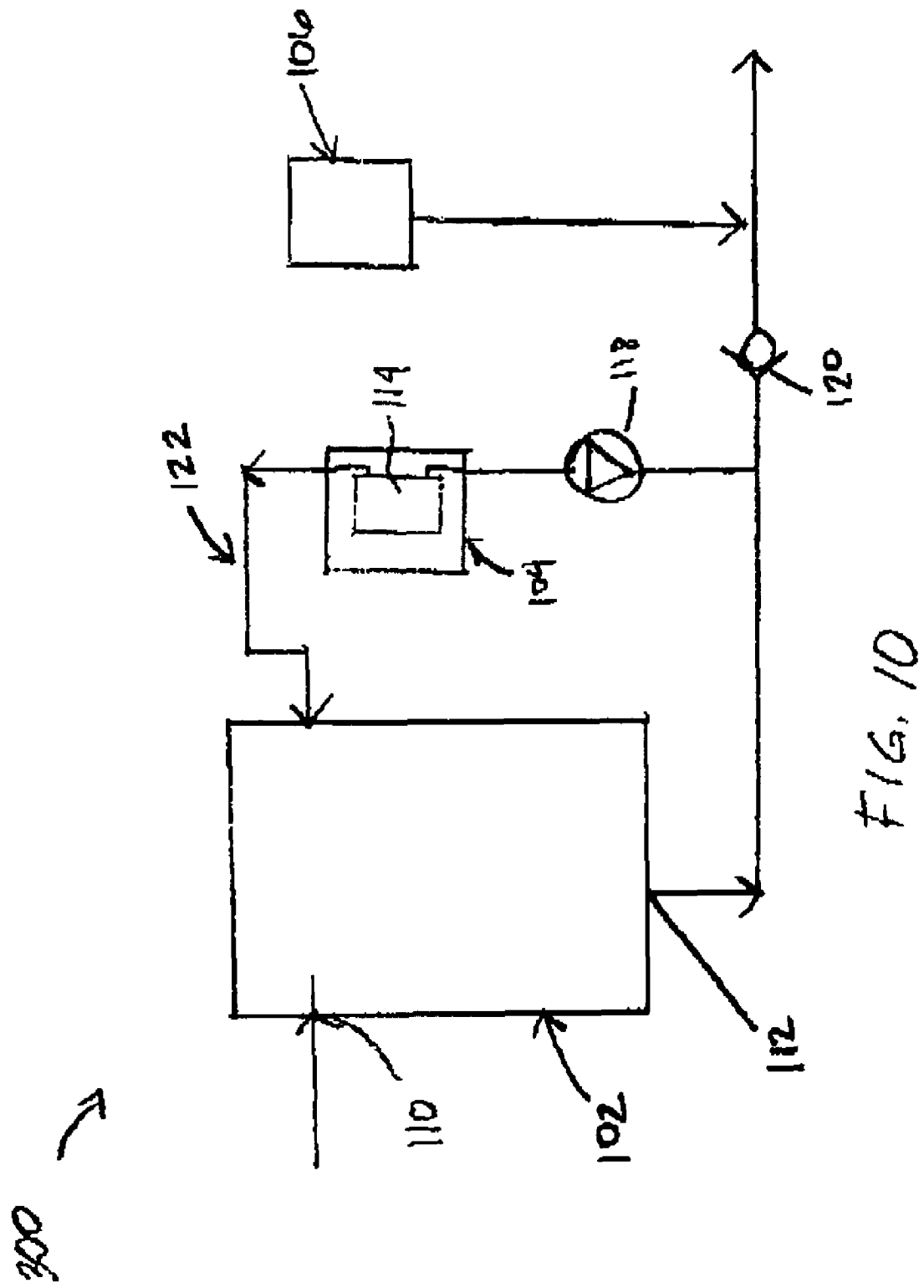
FIG. 10 is a process flow diagram of another embodiment of a beverage dispenser apparatus as described herein.

FIGS. 5, 6 and 7 represent embodiments within the first general embodiment of the invention.

In FIG. 5 a tank 50 is made of a material containing a microbiological agent or has a coating of such an agent applied to its internal surfaces. Water can enter through inlet 51 in roof 52 and leave through outlet 53 in floor 54. The roof contains a vent 56 with an optional air filter 57.

Inside the tank a paddle 58 attached to an arm 58A is rotatable by external motor 59. Thus when the paddle 58 is submerged in water in the tank, it can be rotated to agitate the water and to cause improved contact between the water and the treated tank surfaces.

In FIG. 6 a tank 60 is made of similar material to that of tank 50. It has an inlet 61 in its roof 62 and an outlet 63 in its floor 64. It also has a vent 66 with a filter 67 in its roof 62. Outlet 63 leads via a non-return valve 68 to the desired end use, e.g. a dispense nozzle, not shown, for the water. A recirculation loop 69 runs from between outlet 63 and non-return valve 68 to a further inlet 70 in roof 62 of the tank. A pump 71 in the recirculation loop enables water in tank 60 to be pumped either continuously or intermittently from the tank around loop 69 and back to the tank, thereby improving contact time with the internal surfaces of the tank for all the water.

In FIG. 7 a tank 80 is made of similar material to that of tanks 50 and 60. It has an inlet 81 in its roof 82 and an outlet 83 in its floor 84. It also has a vent 86 with a filter 87 in its roof 82. As in FIG. 6, outlet 83 leads via a non-return valve 88 to the desired end use for the water. A recirculation loop 89 leads back into the tank via inlet 90 in the tank roof. Again loop 89 runs from between outlet 83 and non-return valve 88. A pump 91 enables water to be recirculated from the tank and around the loop.

In this embodiment the recirculation loop also contains a chamber or cartridge 92 filled with a microbiological agent, e.g. in foam or granule carrier form 93. Thus the recirculation not only improves contact with the tank walls but provides a further microbiological contact zone in the cartridge 92.

The cartridge 92 and/or an insert carrying the microbiological agent within the cartridge 92 may be replaceable after a period of use. In this way, the microbiological agent may be renewed to maintain the effectiveness of the agent to kill or deter microbiological growth in the water. In a variation of the FIG. 7 arrangement, the microbiological agent may be present in the re-circulation loop only, e.g. in cartridge 92.

The cartridge 92 and/or insert may be replaced at regular intervals of time. Alternatively, the cartridge 92 and/or insert may be replaced after a pre-determined volume of water has been drawn off. In this way, variations in use of the apparatus are taken into account before replacing the cartridge 92 and/or insert.

Means may be provided to give a visual and/or audible warning locally or at a remote location when the cartridge 92 and/or insert needs to be replaced. For example a light or buzzer may be activated on the apparatus or a signal may be transmitted to a remote location when the cartridge 92 and/or insert needs to be replaced.

FIG. 8 shows one embodiment of a beverage dispenser apparatus 100 which includes water tank 102, having water inlet 110 and discharge outlet 112, and a separate beverage component source 106. The apparatus 100 further includes a pump 118 and a recirculation loop 122 that has a cartridge 104 containing an antimicrobial agent. Water flowing through non-return valve 120 can be mixed with a beverage component from the beverage component source 106.

FIG. 9 shows one embodiment of a beverage dispenser apparatus 200 wherein the top of the water tank 102 includes a collapsible membrane 108 as a barrier to atmosphere.

FIG. 10 shows one embodiment of a beverage dispenser apparatus 300 wherein cartridge 104 includes an internal labyrinth 114 to increase contact time between water and the antimicrobial agent as the recirculated water flows through the cartridge.

It will be understood the invention is not limited to the embodiments above-described.

For example, features in any of the embodiments may be employed separately or in combination with features from any of the other embodiments to provide apparatus with a microbiological agent to kill or deter microbiological growth.

Thus, the re-circulation arrangements shown in FIGS. 6 and 7 may equally be used in conjunction with any of the tank arrangements of the other Figures.

Where the microbiological agent is provided by a carrier or other support medium arranged internally or externally of the tank, it is preferably renewable to maintain the effectiveness of the agent. In other words, the carrier or support medium is replaceable.

The apparatus may include means to monitor the quality of the water in the reservoir and/or re-circulation loop where provided. The monitoring means may provide a warning of microbiological growth outside acceptable limits. The monitoring means may provide a warning locally or generate a signal for transmission to a remote location. The monitoring means may activate a shut-off valve to prevent dispense of water if the detected quality is outside acceptable limits.

The invented apparatus may be used to provide a source of water in a beverage dispenser for hot and/or cold drinks. The water may be mixed with other components e.g. flavouring agents, colouring agents, sweeteners etc, to produce different beverages for user selection. The dispenser may include a carbonator for dispense of still or carbonated water with or without additional components added.

Other modifications and improvements will be apparent to those skilled in the art and are deemed within the scope of the invention.

The invention claimed is:

1. A beverage dispenser comprising:

a water tank having a water inlet and a separate water outlet;

a microbiological agent comprising a biocide, a biostatic agent, or combination thereof;

a circulation means within or attached to the water tank, which circulation means comprises an agitator, a recirculation loop, or both an agitator and a recirculation loop; and a source of a beverage component for mixing with water flowing from the water tank, wherein the microbiological agent is present in the water tank in or on a carrier, which carrier is in open-cell foam, fiber or granular form having a surface area for contact with the liquid, and the circulation means is configured such that water which flows into the tank through the water inlet contacts the microbiological agent before the water flows out of the discharge outlet or before the water mixes with the beverage component, and wherein the open-cell foam, fibers or granules are in the form of a layer through which the water must pass on its travel from the inlet to the outlet of the water tank, and wherein the layer floats on the water that has passed through it.

2. A beverage dispenser comprising:

a water tank having a water inlet and a separate water outlet;

a microbiological agent comprising a biocide, a biostatic agent, or combination thereof;

a circulation means within or attached to the water tank, which circulation means comprises an agitator, a recirculation loop, or both an agitator and a recirculation loop; and a source of a beverage component for mixing with water flowing from the water tank, wherein the microbiological agent is present in the water tank in or on a carrier, which carrier is in open-cell foam, fiber or granular form having a surface area for contact with the liquid, and the circulation means is configured such that water which flows into the tank through the water inlet contacts the microbiological agent before the water flows out of the discharge outlet or before the water mixes with the beverage component, and wherein the water tank has a sump in its floor and the carrier is in the sump.

* * * * *